United States Patent [19]
Germain

[11] 3,931,513
[45] Jan. 6, 1976

[54] SENSING CIRCUIT FOR TAPE POSITION MARKERS

[75] Inventor: Lloyd Michael Germain, Woodland Hills, Calif.

[73] Assignee: Ampex Corporation, Redwood City, Calif.

[22] Filed: Sept. 23, 1974

[21] Appl. No.: 508,438

[52] U.S. Cl. ............ 250/205; 250/209; 250/214 E; 250/557; 250/561; 315/151
[51] Int. Cl.² .......................................... G01J 1/32
[58] Field of Search .......... 250/205, 206, 214, 555, 250/557, 559, 561, 566, 568, 208, 209; 315/151

[56] References Cited
UNITED STATES PATENTS

| | | | |
|---|---|---|---|
| 3,436,553 | 4/1969 | Bevis | 250/205 X |
| 3,566,132 | 2/1971 | Walker | 250/214 |

*Primary Examiner*—Eli Lieberman
*Assistant Examiner*—E. R. LaRoche

[57] ABSTRACT

A circuit for sensing beginning of tape (BOT) and end of tape (EOT) tape position markers on digital magnetic tape includes an illumination source disposed to emit controlled illumination onto a marker sense position along the length of a tape path, a pair of photosensors disposed to sense illumination from the illumination source which is reflected from different positions across the width of a tape lying in the tape path, a control circuit coupled to control the illumination intensity emitted by the illumination source to maintain a predetermined illumination intensity at the photosensor receiving the least intense illumination, and a comparator connected to sense and indicate substantial differences in light intensities received by the two photosensors. The utilization of a feedback signal dependent on actually sensed illumination intensity permits the controlled illumination source to drive the photosensors with a predetermined reflected illumination intensity irrespective of the reflective characteristics of the magnetic tape over wide temperature variations. Adjustment of the gain for at least one photosensor amplifier readily permits compensation at the time of manufacture for deviations from symmetry in positioning the illumination source and photosensors as well as compensation for tolerance variations in circuit components.

15 Claims, 1 Drawing Figure

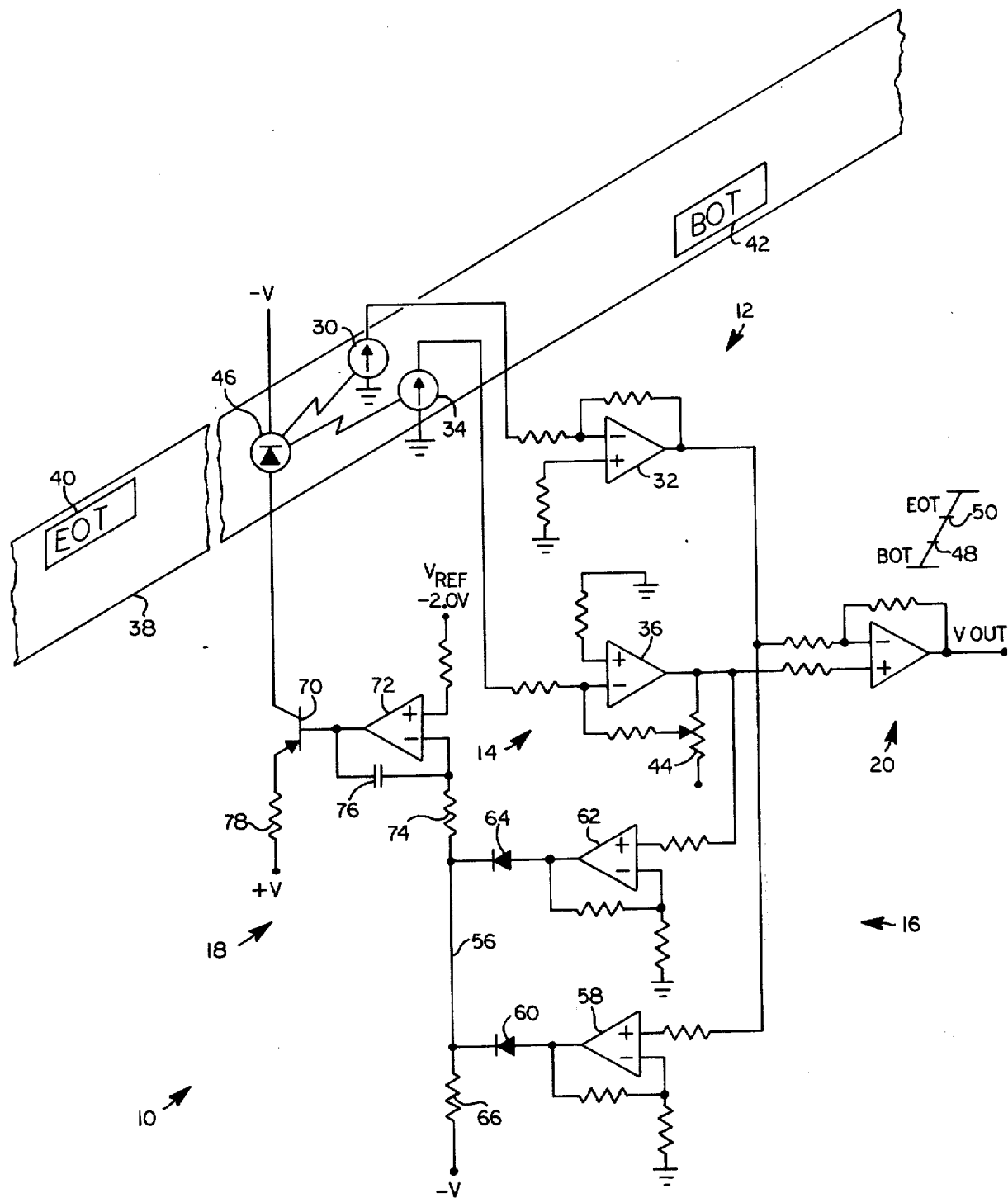

SENSING CIRCUIT FOR TAPE POSITION MARKERS

The invention herein described was made in the course of a contract with the United States Government.

BACKGROUND OF THE INVENTION

1. Field of the Invention

This invention relates to a tape position marker sensing circuit for sensing EOT and BOT markers on magnetic tape and more particularly to a position marker sensing circuit which controls the energization of an illumination source to maintain the intensity of illumination reflected from a magnetic tape at a reference level.

2. Description of the Prior Art

Digital magnetic tape transports utilize reflective markers positioned a few feet from the beginning and end of a reel of tape to delimit the region along the length of the tape on which information may be written. Sensing of a beginning of tape (BOT) marker indicates that reading or writing may commence in a forward direction and indicates that the initial end of the tape is being approached as tape is being rewound. The sensing of an end of tape (EOT) marker indicates that the end of the tape is approaching and that reading or writing in the forward direction should be terminated.

The reflective EOT and BOT markers are typically about an inch in length and are disposed adjacent the back or nonoxide side of the tape with one being disposed across a first or left hand half of the tape and the second being disposed across a second or right hand half of the tape. A light source is disposed to shine light on a marker sense position along the length of the tape and first and second photosensors are disposed to receive light from the light source which reflects from the left and right half respectively of a tape lying in the tape path. The outputs of the two photosensors are compared to a reference and the photocell signal greater than the reference indicates that a photocell is receiving an increased intensity of reflected light due to the presence of a tape marker at the marker sensing position. An increased intensity at one cell indicates the presence of the marker.

These tape marker sensing circuits must function under a variety of operating conditions which affect circuit operation. One of these conditions is temperature, which tends to affect all circuit components, but has a greatest effect on the intensity of illuminated light where a light emitting diode is utilized as the illumination source. Because of this temperature dependence, a reference level that is selected for one temperature may not be suitable for a substantially different temperature because of uncompensated changes in the light source and photosensors with temperature. As a result, either temperature isolation or temperature compensation must be employed to permit the circuit to operate properly over a wide range of temperatures.

Another operating condition which substantially affects circuit operation is the color or reflective characteristics of magnetic tape which is being sensed by the circuit. A tradeoff must be established in presetting the reference level for best noise immunity for sensing tape position markers. A dark or non-reflective tape provides the best noise immunity and permits the reference level to be set relatively low to permit a reflective marker to be readily sensed. Alternatively, a light or highly reflective tape requires the sensing reference level to be set somewhat higher with an attendant decrease in the noise immunity due to the fact that there is less difference in the sensed intensity of light reflected from the tape and the position markers. If the intensity sensing level is selected to accommodate more reflective tapes, the better noise immunity of less reflective tapes cannot be fully utilized. On the other hand, if the reference is placed at a lower level to utilize the better noise immunity of less reflective tapes, it may not be possible to utilize the circuit with the more highly reflective tapes. Other problems are encountered when minor asymmetry in the actual positioning of the illumination source and sensors results in deviation of the sensed reflected illumination intensity from that which is expected and when long term variations develop in the intensity of emitted illumination.

SUMMARY OF THE INVENTION

A tape position marker sensing circuit in accordance with the invention senses the presence of reflective EOT and BOT markers on digital magnetic tape and includes a controlled illumination source disposed to illuminate a marker sense position along the length of a magnetic tape path, a pair of illumination sensors disposed to receive emitted light which is reflected from different positions across the width of the magnetic tape path, an illumination control circuit coupled to control the illumination source to maintain the least intense of the two reflected illuminations at a predetermined level, and a comparator coupled to indicate substantial differences in the intensities of illumination which are received by the illumination sensors. With silicon solar cells, which have reasonably good temperature stability over a wide range of temperatures, used as the illumination sensors, the use of optical feedback to control the illumination source in accordance with sensed illumination permits use of an LED for the illumination source even where wide temperature variations which affect light emitting characteristics may be encountered. The optical feedback in effect stabilizes the output of the LED to the considerably more temperature stable outputs of the solar cells. An output which is dependent upon a combination of characteristics of the electro-optical apparatus is stabilized by comparison with a reference signal. Because the circuit controls the intensity of the illumination which is actually reflected from a magnetic tape, the circuit automatically adjusts to utilize the better noise immunity available from less reflective tapes while permitting satisfactory operation when more reflective tapes are employed. Furthermore, the provision of a gain adjustment in at least one of the illumination sensing circuits readily permits factory compensation for variations in symmetry which result from non-exact alignment of the illumination source and illumination sensors.

BRIEF DESCRIPTION OF THE DRAWINGS

A better understanding of the invention may be had from a consideration of the following Detailed Description taken in conjunction with the accompanying drawing which provides a schematic diagram representation of a tape position marker sensing circuit in accordance with the invention.

DETAILED DESCRIPTION

Making reference to the drawing, there is shown a tape marker sensing circuit 10 which includes first and second illumination sensing circuits 12, 14 and an illumination control circuit 16 coupled to control an illumination source 18 to maintain the intensity of reflected illumination which is received by the illumination sensing circuit 12 or 14 which receives the least intense illumination at a predetermined level, and a differential amplifier circuit 20 which is coupled to compare illumination intensity signals and to generate an output signal which is indicative of substantial differences in illumination intensities as sensed by the illumination sensing circuits 12, 14. The illumination sensing circuit 12 includes a photosensor 30 such as a silicon solar cell and an amplifier 32 while the illumination sensing circuit 14 similarly includes a photosensor 34 and an amplifier 36 having an adjustable gain. The photosensors 30, 34 are disposed adjacent a marker sense point along the length of a tape path 38 at different positions across the width of the tape path 38 to sense reflective EOT and BOT reflective markers 40, 42 respectively. A gain adjustment potentiometer 44 for amplifier 36 permits factory compensation for alignment errors in the positioning of the photosensors 30, 34 and a light emitting diode 46. Potentiometer 44 also permits compensation for gain differences in the two illumination sensing circuits 12, 14 which may result from ordinary component tolerances. The amplifiers 32, 36 receive first and second light intensity signals from the photosensors 30, 34 respectively and provide first and second amplified light intensity signals at their respective outputs. Amplifier 20 is coupled to receive the first and second amplified light intensity signals as inputs and generate an output signal Vout, in response thereto. The magnitude of the signal Vout is within threshold values 48, 50 so long as the first and second amplified light intensity signals are substantially equal, as when no reflective marker is in the vicinity of one of the photosensors 30, 34. The presence of the EOT reflective marker 40 in the vicinity of photosensor 30 causes photosensor 30 to generate more current which is applied to the negative input of the amplifier 32 and causes the first amplified light intensity signal output therefrom to become substantially more negative than the second amplified light intensity signal. The first amplified light intensity signal is applied to the negative input of amplifier 20 to drive signal Vout positive beyond threshold 50 to indicate the presence of the EOT reflective marker 40 at the marker sensing position. Similarly, the presence of the BOT reflective marker 42 at the marker sensing position causes photosensor 34 to generate an increased output to drive the second amplified light intensity signal more negative. This signal is applied to the positive input of amplifier 20 to drive signal Vout more negative beyond the threshold 48.

The illumination control circuit 16 responds to the first and second amplified intensity signals to generate an illumination control signal at point 56 which is responsive to the least negative of the first and second amplified intensity signals and becomes increasingly negative as the least negative amplified intensity signal becomes more negative as the light intensity increases at the appropriate photosensors 30 or 34. Control circuit 16 includes a third, noninverting amplifier 58 and a first diode 60 having the anode thereof connected to the output of amplifier 58 and the cathode connected to signal point 56. A fourth, noninverting amplifier 62 is responsive to the second amplified light intensity signal and drives the anode of a second diode 64 having the cathode thereof connected to signal point 56. Signal point 56 is also connected through a resistance 66 to a negative voltage source to ensure that at least one of the diodes 60, 64 is forwarded biased. Because of the selected polarity for the diodes 60 and 64, the voltage at signal point 56 follows the voltage commanded by the least active photosensor 30 or 34 with the diode corresponding thereto conducting and the diode corresponding to the photocell which receives the most reflective light being reverse biased.

So long as no reflective marker is present at the marker sensing position, the first and second amplified light intensity signals are at substantially the same voltage level and diodes 60 and 64 are driven with substantially the same signals to generate a voltage of approximately $V_{REF} = -2$ volts at signal point 56. However, if one of the reflective markers 40 or 42 reaches the marker sensing position, the corresponding amplified light intensity signal becomes substantially more negative to drive the anode of the corresponding diode more negative to reverse bias that diode. For example, if the EOT reflective marker 40 reaches the marker sense position, the first amplified light intensity signal from amplifier 32 becomes substantially more negative than the second amplified light intensity signal from amplifier 36. Amplifier 58 responds by driving the anode of diode 60 negative with respect to the anode of diode 64 to reverse biase diode 60. Diode 64 then remains forward biased to generate the light intensity control signal appearing at signal point 56 in response to light which is reflected from the magnetic tape 38 as opposed to light which is reflected from a reflective marker. Alternatively, if the BOT marker 42 appears in the vicinity of the marker sense position, diode 64 becomes reverse biased and the light intensity control signal appearing at circuit point 56 is generated through forward biased diode 60. In this way the light received by the photosensors 30 or 34 which receives the least intense reflected illumination controls the energization of the light source to maintain the intensity of illumination which is reflected from the tape 38 itself at a predetermined reference level over a wide range of temperature and tape reflectivity conditions.

In addition to the light emitting diode 46 which is disposed to reflect substantially equal light intensities from an end of tape sensing position at the left side of tape 38 onto photosensor 30 and from a beginning of tape sensing position at the right half of tape 38 onto photosensor 34, the illumination source 18 includes a PNP current control transistor 70 and a differential amplifier 72. The inverting input to amplifier 72 is coupled through a resistance 74 to the circuit point 56 to receive the illumination control signal and is also coupled through a capacitor 76 to the output of amplifier 72. The resistor 74 and capacitor 76 provide frequency compensation to prevent oscillation of the reflective marker sensing circuit 10. The positive input to amplifier 72 is connected through a resistance to a $-2$ volt reference voltage, $V_{REF}$. The cathode of light emitting diode 46 is coupled to a negative voltage source, $-V$ while the anode is coupled to the collector of transistor 70. The emitter of transistor 70 is coupled through a resistance 78 to a positive voltage source $+V$. The base of transistor 70 is coupled to the output of amplifier 72.

During operation, the light emitting diode 46 is driven with sufficient energization to maintain the illumination control signal at circuit point 56 at approximately the reference voltage of −2 volts. If the illumination intensity which is emitted by diode 46 tries to decrease, one of the photosensors 30, 34 which receives reflected light from the tape 38 and not one of the markers 40, 42 receives decreased light intensity and generates a lower output current. For instance, if no reflective marker is present beneath sensor 30, a decreased light intensity signal is input to the negative input of amplifier 32 to drive the first amplified light intensity signal more positive. This signal is amplified by amplifier 58 to drive the anode of diode 60 more positive and therefore the cathode of diode 60 more positive. The cathode of diode 60 determines the voltage of the light intensity control signal at circuit point 56 to drive the negative input of amplifier 72 more positive and cause the output thereof to become more negative. As the output of amplifier 72 drives the base of transistor 70 more negative, the emitter of transistor 70 must also become more negative to permit current to flow through the transistor. As the emitter of the transistor 70 becomes more negative the voltage drop across resistance 78 must increase and this means that more current flow through resistance 78 and hence diode 46. This increased diode current opposes the tendency of LED 46 to emit decreased light intensity. In a similar manner, if the illumination emitted by diode 46 tends to decrease, the current therethrough is increased to maintain the intensity of emitted illumination at a predetermined, controlled level.

While there has been shown and described above a tape marker position sensing circuit in accordance with the invention for the purpose of enabling a person of ordinary skill in the art to make and use the invention, it will be appreciated that the invention is not limited thereto. Accordingly any modifications, variations or equivalent arrangements within the scope of the accompanying claims should be considered to be within the scope of the invention.

What is claimed is:

1. A tape position marker sensor for sensing reflective markers at different positions across a magnetic tape path for a magnetic tape transport, the sensor comprising:
    a light source disposed to illuminate the tape path with an illumination intensity which is dependent upon an illumination command signal;
    a pair of photo detectors disposed to detect the intensities of illumination from the light source which are reflected from different positions across the width of the tape path and generate light intensity signals indicative thereof; and
    control circuit means for generating an illumination command signal in response to the light intensity signals to command a light source illumination of proper intensity to maintain the light intensity signal from the photo detector receiving illumination of least intensity at a predetermined level.

2. The tape position marker sensor as set forth in claim 1 above further comprising a comparator connected to compare the light intensity signals from the pair of photo detectors and indicate a significant difference in the compared light intensity signals.

3. The tape position marker sensor as set forth in claim 2 above, wherein the photo detectors are silicon solar cells.

4. The tape position marker sensor as set forth in claim 3 above, wherein the light source includes a single light emitting diode providing all of the illumination which is emitted from the light source.

5. A tape position marker sensor circuit for detecting the presence of a marker appearing on a length of tape at a marker sense position along a tape path therefor, the marker being more reflective than the tape and extending across only a portion of the width of the tape, the tape position sensor comprising:
    an illumination source disposed to illuminate the marker sense position with illumination of controlled intensity;
    an illumination controller connected to sense the intensity of illumination which is reflected from the tape from at least two positions across the width of the tape at the marker sense position and control the illumination source to maintain the least intense sensed illumination at a predetermined intensity of sensed illumination in response thereto; and
    a marker sensor disposed to sense an intensity of illumination reflected from the marker sense position which is different from the intensity of illumination which is reflected from the tape and generate a tape marker output signal in response thereto.

6. The tape position marker sensor circuit as set forth in claim 5 above wherein the illumination controller includes at least two illumination sensors disposed to sense reflected illumination intensity from at least two different positions across the width of the tape path and generate sensed illumination intensity signals indicative of illumination intensity sensed thereby.

7. The tape position marker sensor circuit as set forth in claim 6 above, wherein at least one of the illumination sensors includes an amplification circuit with an adjustable gain control.

8. The tape position marker sensor circuit as set forth in claim 6 above, wherein the marker sensor includes a comparator connected to compare the sensed intensity signals generated by a pair of illumination sensors and generate a tape marker output signal in response to a substantial difference in the sensed signals.

9. The tape position marker sensor circuit as set forth in claim 8 above, wherein each illumination sensor includes a silicon photocell disposed along the tape path to receive illumination from the illumination source only after reflection from a selected position across the width of the tape path.

10. A circuit for sensing a reflective marker occupying a portion of the width of a tape passing along a tape path, the circuit comprising:
    first and second photosensors disposed to receive light reflected off different first and second positions respectively across the width of a tape lying in the tape path and generate light intensity signals indicative of received light intensities;
    first and second amplifiers connected to receive and amplify the light intensity signals of the first and second photosensors respectively to generate first and second amplified light intensity signals, the amplified light intensity signals becoming increasingly negative with increasing light incident upon the respective photosensors;
    first and second rectifiers having their cathodes coupled together and their anodes coupled to the first and second amplified light intensity signals respectively;
    a light source disposed to illuminate the tape path with light that reflects off first and second positions across the width of a tape lying in the tape path to the first and second photosensors respectively, the light source being responsive to the coupled cathodes of the first and second rectifiers by increasing the intensity of emitted light as the coupled cathodes become more positive; and a comparator coupled to compare the amplified light intensity signals and generate a tape marker output signal in response to a substantial difference therebetween.

11. The circuit as set forth in claim 10 above, further comprising a resistance coupled between the coupled cathodes of the first and second rectifiers and a negative voltage source.

12. The circuit as set forth in claim 11 above, wherein the light source comprises a third differential amplifier having an output, positive and negative inputs and a capacitor coupled between the output and the negative input, the negative input being coupled through a resistance to the coupled cathodes of the first and second rectifiers and the positive input being coupled to a negative reference voltage, the light source further comprising a PNP transistor having an emitter coupled through a resistance to a positive voltage source, a base coupled to the output of the third amplifier and a collector, and a light emitting diode coupled to conduct current from the collector to a negative voltage source.

13. The circuit as set forth in claim 11 wherein at least one of said first and second amplifiers includes circuitry for adjusting the gain thereof to compensate for differences in positional symmetry of the light source and photosensors and differences in circuit components.

14. The circuit as set forth in claim 11 above, further comprising a third, non-inverting amplifier coupled to drive the anode of the first rectifier in response to the first amplified light intensity signal and a fourth, non-inverting amplifier coupled to drive the anode of the second rectifier in response to the second amplified light intensity signal.

15. The circuit as set forth in claim 12 above, wherein the comparator comprises a third, differential amplifier having an output providing the tape marker output signal, a negative input coupled through a resistance to the first amplified light intensity signal and coupled through a feedback resistance to the output and a positive input coupled through a resistance to the second amplified light intensity signal.

* * * * *